United States Patent
Boaz

(12) 
(10) Patent No.: US 6,286,338 B2
(45) Date of Patent: *Sep. 11, 2001

(54) BLOCK ASSEMBLY FOR A GAS-TYPE LEHR

(75) Inventor: Premakaran T. Boaz, Livonia, MI (US)

(73) Assignee: Visteon Global Technologies, Inc., Dearborn, MI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/030,784

(22) Filed: Feb. 26, 1998

(51) Int. Cl.$^7$ .................................................. C03B 18/00
(52) U.S. Cl. .................. 65/182.2; 65/182.1; 65/182.5; 65/24; 65/25.1; 65/25.2; 65/25.4; 432/120; 432/194
(58) Field of Search .................. 65/24, 25.1, 25.2, 65/25.4, 182.1, 182.2, 182.5, 286, 90, 93, 99.1, 100, 258; 432/120, 124, 160, 164, 247, 251; 373/30, 137

(56) References Cited

U.S. PATENT DOCUMENTS

| | | | |
|---|---|---|---|
| 498,640 | * | 5/1893 | Forbes . |
| 838,270 | * | 12/1906 | Peters . |
| 1,100,062 | * | 6/1914 | Faulds . |
| 2,476,204 | * | 7/1949 | Mastercole . |
| 2,853,440 | * | 9/1958 | Hughes . |
| 2,915,877 | * | 12/1959 | Darling . |
| 3,332,759 | | 7/1967 | McMaster et al. ................ 65/25 |
| 3,375,093 | * | 3/1968 | Reising .............................. 65/25.4 |
| 3,375,094 | * | 3/1968 | McMaster et al. ................ 65/25.4 |
| 3,402,036 | | 9/1968 | McMaster . |
| 3,486,869 | * | 12/1969 | Alonzo et al. . |
| 3,486,876 | * | 12/1969 | Augustin et al. ................... 65/182.1 |
| 3,520,670 | * | 7/1970 | Schlehr ............................... 65/24 |
| 3,526,491 | * | 9/1970 | Sharrock ............................ 65/182.2 |
| 3,767,375 | * | 10/1973 | Brichard et al. ................... 65/182.5 |
| 3,854,920 | * | 12/1974 | Kay et al. . |
| 4,003,696 | * | 1/1977 | Rolla . |
| 4,059,427 | | 11/1977 | Starr et al. ......................... 65/25 |
| 4,664,692 | | 5/1987 | Simomura et al. ................ 65/182.2 |
| 4,732,513 | | 3/1988 | Lemhart ............................ 40/88 |
| 5,007,950 | * | 4/1991 | Krushinski et al. ............... 65/182.5 |
| 5,078,776 | | 1/1992 | Kajii et al. ......................... 65/182.2 |
| 5,110,338 | | 5/1992 | McMaster ......................... 65/182.2 |
| 5,230,728 | | 7/1993 | McMaster ......................... 65/273 |
| 5,330,549 | | 7/1994 | Carlomagno et al. ............. 65/182.2 |
| 5,340,375 | | 8/1994 | Anttonen .......................... 65/104 |
| 5,380,348 | | 1/1995 | Boaz .................................. 65/25.2 |
| 5,522,912 | | 6/1996 | Kobayashi et al. ............... 65/182.2 |
| 5,667,547 | * | 9/1997 | Christiansen et al. . |

FOREIGN PATENT DOCUMENTS 0477913   9/1991   (EP) .

OTHER PUBLICATIONS

Lewis, Richard, J. "Hawley's Condensed Chemical Dictionary", 12th Ed., p. 164, 1993.*

* cited by examiner

Primary Examiner—Michael P. Colaianni
(74) Attorney, Agent, or Firm—Larry I. Shelton

(57) ABSTRACT

A block assembly for a lehr includes a plurality of blocks extending longitudinally, each of the blocks having a seal surface for mating and overlapping with an adjacent one of the blocks.

19 Claims, 2 Drawing Sheets

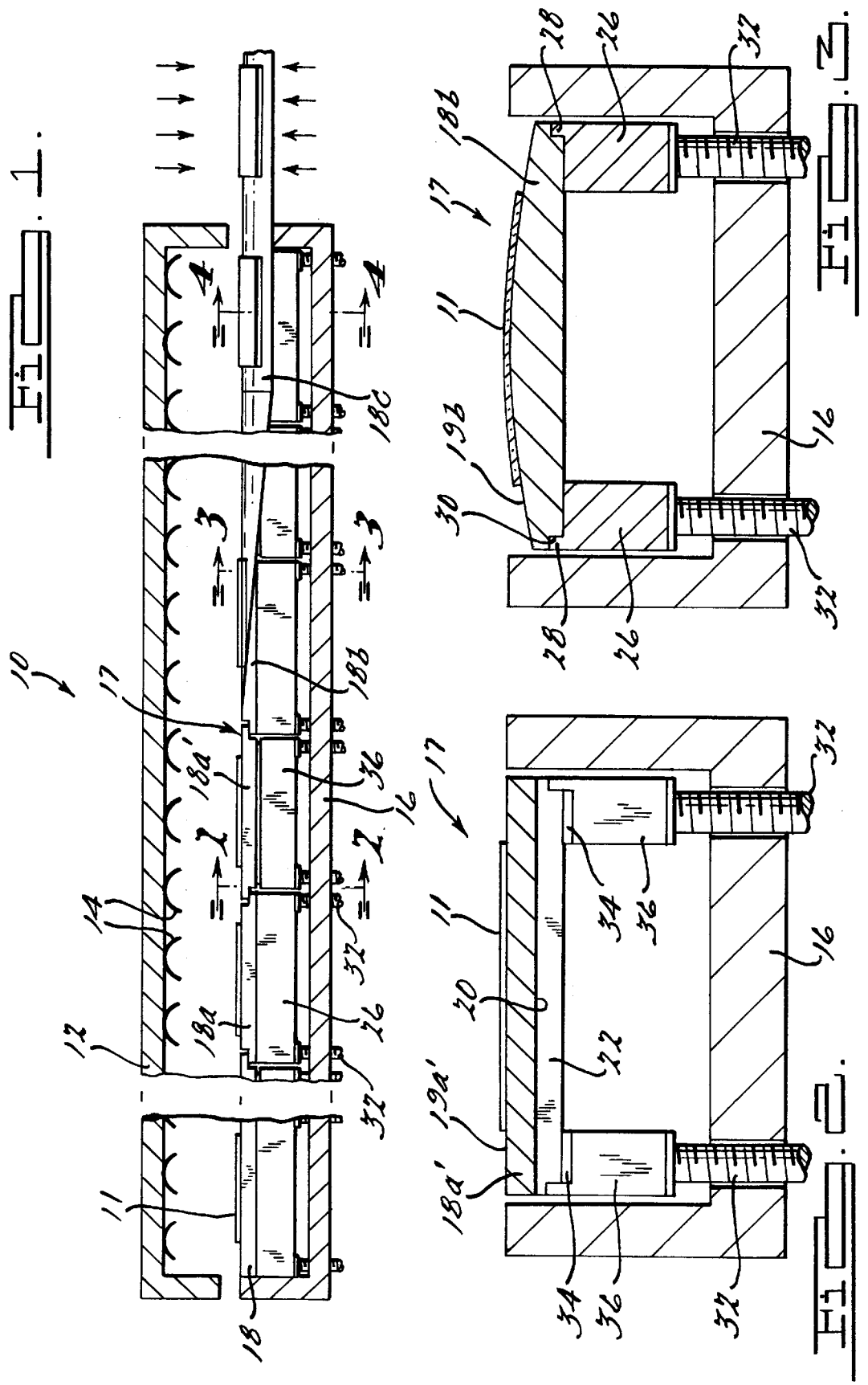

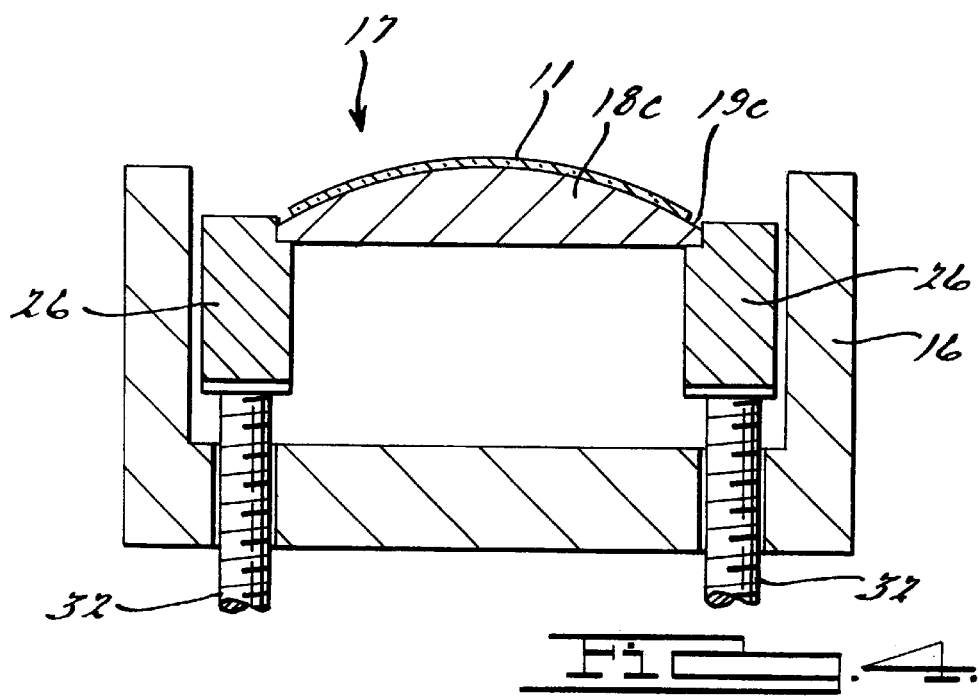
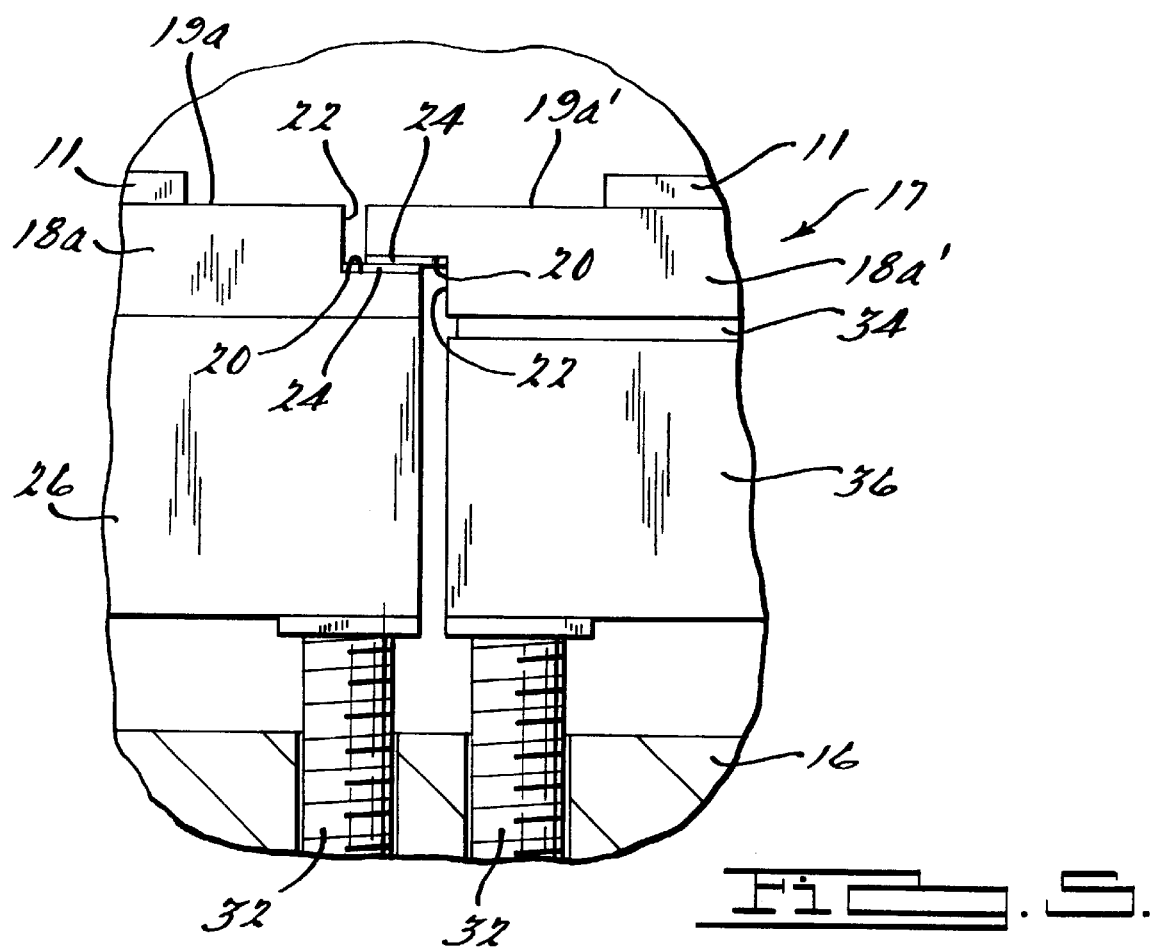

BLOCK ASSEMBLY FOR A GAS-TYPE LEHR

BACKGROUND OF THE INVENTION

1. Field of the Invention

The present invention relates generally to lehrs for heating and forming glass sheets and, more specifically, to a block assembly for a gas-type lehr.

2. Description of the Related Art

It is known to heat and form glass sheets using a "hearth" or "lehr". Generally, the lehr is a furnace and may be of a continuous roller-type, fixtured roller-type or gas-type. For example, a gas-type lehr has a plurality of blocks disposed beneath a plurality of radiant heaters. Each block is supported along its transverse sides by refractory slabs or support lintels mounted upon jacks. Typically, four jacks are used for each block with two jacks, one at each longitudinal end, for each lintel. The jacks are adjustable, thereby making possible manual adjustment of the vertical location of each block so that upper surfaces of the blocks can be brought into alignment with each other.

In operation of the gas-type lehr, a glass sheet is placed inside the lehr where it is heated by conventional radiation, convection and conduction heat. The glass sheet is moved along the blocks at a predetermined rate which depends on the thermal conductivity of the glass sheet to reach a temperature in its forming range. When the glass sheet is at a temperature in its forming range, the glass sheet is formed to a predetermined shape of the blocks. Once formed, the glass sheet is either quenched, annealed or tempered.

Although the above lehr has worked well, it suffers from the disadvantage that the alignment of a top contour or upper surface of the blocks is required for correctly forming the glass sheet. This requires extensive adjustment and alignment of the blocks inside the lehr which is labor intensive and costly. Another disadvantage of the above lehr is that seals are required between the longitudinal ends of the blocks which requires a separate part and is costly. As a result, there is a need in the art to provide a block assembly for alignment of the blocks prior to installation inside the lehr and to reduce or eliminate adjustment of the blocks inside the lehr.

SUMMARY OF THE INVENTION

Accordingly, the present invention is a block assembly for a lehr. The block assembly includes a plurality of blocks extending longitudinally. Each of the blocks have a seal surface for mating and overlapping engagement with an adjacent one of the blocks.

One advantage of the present invention is that an improved block assembly for a lehr is provided. Another advantage of the present invention is that the block assembly has the blocks aligned at the block manufacturer prior to installation inside the lehr, thereby allowing the blocks to be simply placed in position inside the lehr. Yet another advantage of the present invention is that the block assembly reduces alignment complexity of the blocks for the lehr, resulting in less installation time, labor and cost. Still another advantage of the present invention is that the block assembly reduces or eliminates the need for seals longitudinally between the blocks.

Other features and advantages of the present invention will be readily appreciated as the same becomes better understood after reading the subsequent description when taken in conjunction with the accompanying drawings.

BRIEF DESCRIPTION OF THE DRAWINGS

FIG. 1 is a fragmentary elevational view of a block assembly, according to the present invention, illustrated in operational relationship with a lehr.

FIG. 2 is a sectional view taken along line 2—2 of FIG. 1.

FIG. 3 is a sectional view taken along line 3—3 of FIG. 1.

PIG. 4 is a sectional view taken along line 4—4 of FIG. 1.

FIG. 5 is an enlarged view of a portion of the block assembly, according to the present invention, for the lehr of FIG. 1.

DESCRIPTION OF THE PREFERRED EMBODIMENT(S)

Referring to the drawings and in particular to FIG. 1, one embodiment of a lehr 10 for use in conjunction with heating and forming a glass templet or sheet 11 is shown. As illustrated, the lehr 10 is of a gas-type continuous furnace for heating and forming the glass sheets 11 as they are continuously conveyed therethrough.

The lehr 10 includes an upper housing 12 extending longitudinally and having a plurality of heaters 14 spaced longitudinally therealong. The heaters 14 are of a radiant type as is known in the art. The lehr 10 also includes a lower housing 16 extending longitudinally. It should be appreciated that the upper housing 12 and lower housing 16 form refractory walls, floor and roof as is known in the art. It should also be appreciated that the lower housing 16 is supported by a support structure on a support surface as is known in the art.

The lehr 10 includes a block assembly, according to the present invention and generally indicated at 17, disposed inside the lehr 10 between the upper housing 12 and the lower housing 16. The block assembly 17 includes a plurality of block 18 extending longitudinally and disposed longitudinally therealong. The blocks 18 are generally rectangular in shape. The blocks 18 are made of a ceramic material with apertures or passageways (not shown) extending therethrough to form a gas support bed for the glass sheets 11. Pressurized gas is forced upwardly through the passageways to heat the underside of the glass sheets 11 and support the glass sheets 11 on a layer of gas. It should be appreciated that the gas escapes from the space between the blocks 18 and the glass sheets 11 through exhaust apertures (not shown) and internal cross bores (not shown) which provide for gas escape guided by baffles (not shown) as is known in the art.

As illustrated in FIGS. 1 through 4, the blocks 18 include a plurality of flat blocks 18a, transition blocks 18b and finish blocks 18c. The flat blocks 18a have a planar upper surface 19a and the transition blocks 18b and finish blocks 18c have a curved upper surface 19b and 19c, respectively, of varying degree to form the glass sheets 11 to a predetermined curvature as is known in the art. It should be appreciated that the glass sheets 11 are moved along the blocks 18 by a drive mechanism such as a chain having fingers (not shown) to catch a corner of each glass sheet 11 to position, guide and drive it through the lehr 10 from left to right as is known in the art.

Referring to FIGS. 1 and 5, the block assembly 17 includes a seal surface 20 on each block 18 for mating and overlapping engagement between a pair of adjacent blocks 18. The seal surface 20 is a generally planar surface extending transversely and longitudinally at each end of the block 18. As illustrated, the block assembly 17 includes a shoulder surface 22 on each block 18 extending vertically and transversely at a longitudinal end of the seal surface 20. On one of the blocks 18a, 18b, 18c, the seal surface 20 and shoulder surface 22 form a general "L" shape at each longitudinal end and on an adjacent block 18a', 18b', 18c', the seal surface 20 and shoulder surface 22 form a general inverted "L" shape at each longitudinal end. The seal surface 20 may include a coating 24 to allow the blocks 18 to freely slide with respect to each other. In one embodiment, the coating 24 is boron nitride. In another embodiment, the coating 24 may be graphite. Alternatively, a ceramic paper such as fiberglass may be placed between the seal surfaces 20. The blocks 18 overlap each other such that the seal surfaces 20 contact and matingly engage each other while allowing a space or gap between the shoulder surfaces 22 at the longitudinal end of blocks 18. The upper surfaces 19a, 19b, 19c and 19a', 19b', 19c' of the blocks 18 are premachined for alignment with respect to the seal surfaces 20 prior to installation inside the lehr 10. It should be appreciated that the contact between the seal surfaces 20 form a seal to maintain gas pressure beneath the blocks 18.

The block assembly 17 also includes a rigid block or lintel 26 disposed along each transverse side of a pair of adjacent blocks 18, preferably the blocks 18a, 18b, 18c. The lintels 26 extend longitudinally and are generally rectangular in shape. The lintels 26 are made of a refractory material and directly contact a lower surface of the blocks 18a, 18b, 18c. The lintels 26 include a shoulder 28 extending longitudinally and upwardly from an upper surface thereof to mate with a corresponding recess 30 extending longitudinally along the blocks 18. Preferably, the shoulder 28 and recess 30 are generally rectangular in shape. It should be appreciated that the shoulder 28 prevents transverse movement of the blocks 18.

The block assembly 17 further includes at least one adjustable or moveable support 32 for supporting the lintels 26 and the blocks 18. Preferably, a pair of adjustable supports 32 are disposed beneath the longitudinal ends of the lintel 26 for an adjacent pair of mating blocks 18. In one embodiment, the adjustable support 32 is a thread-operated jack disposed beneath the lintel 26 to move the lintel 26 and block 18 upwardly or downwardly. It should be appreciated that the adjustable support 32 extends through the lower housing 16 and contacts a support surface to move the lintel 26 and block 18 relative to the support surface.

Optionally, the other one of the pair of adjacent blocks 18, preferably, blocks 18a', 18b', 18c' may include a seal 24 and seal support 36 disposed beneath the blocks 18a', 18b', 18c'. The seal 34 is made of a flexible material and is disposed longitudinally between the seal support 36 and block 18a', 18b', 18c'. The seal support 36 is generally rectangular in shape and extends longitudinally along transverse sides of the block 18a', 18b', 18c'. The seal support 36 may include an adjustable support 32 to adjust the seal 34 and seal support 36 relative to the block 18a', 18b', 18c' to maintain the gas pressure beneath the blocks 18a', 18b', 18c'.

Alternatively, the upper surfaces 19 of a pair of adjacent blocks 18 may be machined to alignment relative to a single support surface such as an upper surface of a lintel 26. In this embodiment, the lintel 26 would be disposed underneath the longitudinal ends of a pair of adjacent blocks 18 and supported by an adjustable support 32 to move the pair of blocks 18 upwardly and downwardly relative to the support surface. It should be appreciated that, in this embodiment, seals would be used between the longitudinal ends of the blocks 18.

As another alternative, a single lintel 26 may be used beneath the longitudinal ends of an adjacent pair of overlapping blocks 18a, 18a'. In this embodiment, the lintel 26 would have a clearance recess underneath block 18a' to allow support of the block 18a only at the seal surface 20. The lintel 26 would be supported by a single adjustable support 32 to adjust or move the pair of blocks 18a, 18a' upwardly and downwardly relative to the support surface.

In operation, the lehr 10 may be used to form the glass sheet 11 as a windshield for a motor vehicle (not shown) by a conventional method. Prior to forming the glass sheet 11, the lintels 26 are placed inside the lehr 10 to rest on the adjustable supports 32. A pair of blocks 18a, 18a' and 18b, 18b' and 18c, 18c' are placed inside the lehr 10 upon the lintels 26 between the shoulders 28 thereof such that the blocks 18 overlap each other and the seal surfaces 20 engage each other. It should be appreciated that the adjustable supports 32 may be moved up or down to correct the overall height or waviness in the longitudinal length of the block assembly 17.

Once assembled, a flat or planar glass sheet 11 is placed on the flat blocks 18a at one end of the lehr 10. The glass sheet 11 is moved along the flat blocks 18a at a predetermined rate and the glass sheet 11 is heated to a predetermined temperature with the heaters 14. For example, the glass sheet 11 is heated by the heaters 14 using an ambient heat of over 1400° F. as the glass sheet 11 travels a certain distance over time to heat the glass sheet 11 to a predetermined temperature. In one embodiment, the predetermined temperature is the softening point of the glass sheet 11 which is approximately 900° F., to 950° F.

When the glass sheet 11 is at its softening point, the glass sheet 11 is further heated at a predetermined rate under the heaters 14 to a predetermined temperature. In one embodiment, the predetermined temperature of the glass sheet 11 is its forming range of approximately 1150° F. to 1250° F. For example, the temperature of the glass sheet 11 is raised from 900° F., to over 1200° F. It should be appreciated that the ambient temperature of the lehr 10 is approximately 1200° F. to maintain the glass sheet 11 at its forming temperature.

When the glass sheet 11 is at the predetermined temperature in its forming range, the glass sheet 11 is formed to a predetermined configuration or curvature. The glass sheet 11 begins to bend to the curvature of the transition blocks 18b and final blocks 18c. The glass sheet 11 is cooled with cool air once the glass sheet 11 exits the lehr 10 to below its softening point and is removed.

Accordingly, the block assembly 17 of the present invention provides a simplified way to align the blocks 18 prior to installation inside the lehr 10. The block assembly 17 eliminates the need for separate seals between the longitudinal ends of blocks 18.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A lehr for heating and forming glass sheets comprising:
a housing extending longitudinally having a tunnel;
a plurality of heaters positioned in a top of said housing and spaced longitudinally in said tunnel for heating glass sheets;
a plurality of first and second blocks positioned in a bottom of said housing below said heaters and extending longitudinally in said tunnel to form a support bed for forming the glass sheets in gaseous contact with the support bed, said gaseous contact formed by pressurized gas forced upwardly through passages in said plurality of first and second blocks; and each of said first and second blocks having a generally planar seal surface extending transversely at a longitudinal end of each of said first and second blocks, said seal surfaces of an adjacent pair of said first and second blocks mating and overlapping each other.

2. A lehr as set forth in claim 1 wherein each of said first and second blocks has an upper surface.

3. A lehr as set forth in claim 2 wherein said upper surface of an overlapping pair of said first and second blocks are machined for alignment vertically relative to said seal surface.

4. A lehr as set forth in claim 1 wherein each of said first and second blocks includes a shoulder surface extending transversely at an end of said seal surface.

5. A lehr as set forth in claim 1 including a coating on said seal surface to allow an overlapping pair of said first and second blocks to slide relatively to each other.

6. A lehr as set forth in claim 1 including a lintel disposed beneath one of an overlapping pair of said first and second blocks.

7. A lehr as set forth in claim 5 including a seal disposed between the overlapping pair of first and second blocks and a seal support disposed beneath the overlapping pair of said first and second blocks.

8. A lehr for heating and forming glass sheets comprising:

a housing extending longitudinally having a tunnel;

a plurality of first and second blocks positioned in a bottom of said housing and extending longitudinally in said tunnel to form a support bed for forming the glass sheets in gaseous contact with the support bed, said gaseous contact formed by pressurized gas forced upwardly through passages in said plurality of first and second blocks;

each of said first and second blocks having a generally planar seal surface extending transversely at a longitudinal end of each of said first and second blocks, said seal surfaces of an adjacent pair of said first and second blocks mating and overlapping each other;

a coating on said seal surface to allow the overlapping adjacent pair of said first and second blocks to slide relative to each other; and wherein said coating is made of boron nitride.

9. A lehr comprising:

a housing extending longitudinally having a tunnel;

a plurality of first and second blocks positioned in a bottom of said housing and extending longitudinally in said tunnel to form a support bed for glass sheets;

each of said first and second blocks having a generally planar seal surface extending transversely at a longitudinal end of each of said first and second blocks for mating and overlapping engagement with each other;

a lintel disposed beneath one of an overlapping pair of said blocks; and at least one adjustable support disposed beneath said lintel to move said lintel and the one of said first and second blocks upwardly and downwardly.

10. A lehr as set forth in claim 9 wherein said adjustable support is a jack.

11. A lehr comprising:

a housing extending longitudinally having a tunnel;

a plurality of first and second blocks positioned in a bottom of said housing and extending longitudinally in said tunnel to form a support bed for glass sheets;

each of said first and second blocks having a generally planar seal surface extending transversely at a longitudinal end of each of said first and second blocks for mating and overlapping engagement with each other;

a seal and seal support disposed beneath the overlapping pair of said first and second blocks; and at least one adjustable support disposed beneath said seal support to move said seal and said seal support upwardly and downwardly.

12. A lehr for heating and forming glass sheets comprising:

a housing extending longitudinally having a tunnel;

a plurality of heaters positioned in a top of said housing and spaced longitudinally in said tunnel for heating glass sheets;

a plurality of first and second blocks positioned in a bottom of said housing below said heaters and extending longitudinally in said tunnel to form a support bed for forming the glass sheets in gaseous contact with the support bed, said gaseous contact formed by pressurized gas forced upwardly through passages in said plurality of first and second blocks;

each of said first and second blocks having an upper surface;

each of said first and second blocks having a generally planar seal surface extending transversely at a longitudinal end of each of said first and second blocks, said seal surfaces of an adjacent pair of said first and second blocks mating and overlapping each other;

said upper surface of the overlapping pair of said first and second blocks are machined for alignment vertically relative to said seal surface; and a lintel disposed beneath one of the overlapping pair of said first and second blocks.

13. A lehr as set forth in claim 12 wherein said seal surface is generally planar and extends transversely at a longitudinal end of each of said first and second blocks.

14. A lehr as set forth in claim 13 wherein each of said first and second blocks includes a shoulder surface extending transversely at an end of said seal surface.

15. A lehr as set forth in claim 14 including a coating on said seal surface to allow an overlapping pair of said first and second blocks to slide relatively to each other.

16. A lehr comprising:

a housing extending longitudinally having a tunnel;

a plurality of first and second blocks positioned in a bottom of said housing and extending longitudinally in said tunnel to form a support bed for glass sheets;

each of said first and second blocks having an upper surface;

each of said first and second blocks having a generally planar seal surface extending transversely at a longitudinal end of each of said first and second blocks for mating and overlapping engagement with each other;

said upper surface of an overlapping pair of said first and second blocks are machined for alignment vertically relative to said seal surface;

a lintel disposed beneath one of an overlapping pair of said first and second blocks; and at least one adjustable support disposed beneath said lintel to move said lintel upwardly and downwardly.

17. A lehr as set forth in claim 16 wherein said adjustable support is a jack.

18. A lehr for heating and forming glass sheets comprising:

a housing extending longitudinally having a tunnel;

a plurality of first and second blocks positioned in a bottom of said housing and extending longitudinally in said tunnel to form a support bed for forming the glass sheets in gaseous contact with the support bed, said gaseous contact formed by pressurized gas forced upwardly through passages in said plurality of first and second blocks;

each of said first and second blocks having an upper surface;

each of said first and second blocks having a generally planar seal surface extending transversely at a longitudinal end of each of said first and second blocks, said seal surfaces of an adjacent pair of said first and second blocks mating and overlapping each other;

said upper surface of the overlapping pair of said first and second blocks are machined for alignment vertically relative to said seal surface;

a lintel disposed beneath one of the overlapping pair of said first and second blocks;

a coating on said seal surface to allow the overlapping pair of said blocks to slide relatively to each other; and wherein said coating is made of boron nitride.

19. A lehr comprising:

a housing extending longitudinally having a tunnel;

a plurality of first and second blocks positioned in a bottom of said housing and extending longitudinally in said tunnel to form a support bed for glass sheets;

each of said first and second blocks having a seal surface for mating and overlapping engagement with each other;

said seal surface being generally planar and extending transversely at a longitudinal end of each of said first and second blocks;

each of said first and second blocks including a shoulder surface extending transversely at an end of said seal surface to form a generally L shape;

a coating on said seal surface to allow an overlapping pair of said first and second blocks to slide relatively to each other;

a lintel disposed beneath one of the overlapping pair of said first and second blocks;

at least one adjustable support disposed beneath said lintel to move said lintel upwardly and downwardly;

each of said first and second blocks having an upper surface; and said upper surface of the overlapping pair of said first and second blocks being machined for alignment vertically relative to said seal surface.

* * * * *